(12) United States Patent
Yamazaki

(10) Patent No.: US 6,633,418 B1
(45) Date of Patent: Oct. 14, 2003

(54) IMAGE READING METHOD AND IMAGE READING APPARATUS

(75) Inventor: Yoshirou Yamazaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/296,265

(22) Filed: Apr. 22, 1999

(30) Foreign Application Priority Data

Apr. 23, 1998 (JP) .......................................... 10-112955

(51) Int. Cl.[7] ................................................. H04N 1/46
(52) U.S. Cl. ........................ 358/506; 358/509; 358/487; 358/475; 358/445; 358/446; 358/443; 358/483; 358/514; 358/504
(58) Field of Search ................................ 358/487, 506, 358/509, 475, 513, 504, 406, 446, 445, 443, 514, 512, 483, 474; 341/132, 155, 172, 142; 359/889, 891, 888, 885

(56) References Cited

U.S. PATENT DOCUMENTS

| | | | | |
|---|---|---|---|---|
| 5,402,249 A | * | 3/1995 | Koseki et al. ............... | 358/446 |
| 5,414,535 A | * | 5/1995 | Kanmoto et al. ........... | 358/487 |
| 5,745,262 A | * | 4/1998 | Tatsumi ...................... | 358/504 |

* cited by examiner

Primary Examiner—Cheukfan Lee
(74) Attorney, Agent, or Firm—Sughrue Mion, PLLC

(57) ABSTRACT

The image reading method and apparatus read photoelectrically an original image by an image sensor and convert an output signal of the image sensor into a digital signal. At least one of an adjusting step of a quantity of light incident upon the image sensor by a light transmittance adjusting operation in an optical path, a sensing condition control step in the image sensor, and an intensity adjusting step of the output signal from the image sensor is used and a maximum value of a signal upon being converted into the digital signal is set to be constant without recourse to the original image. The method and apparatus can attain following effects that a variable aperture is unnecessary, a shading fluctuation occurred in a light quantity adjusting operation is eliminated, and an image reading operation with a maximum use of a dynamic range of a scanner by an apparatus at low costs and at high precision can be executed, in an operation for photoelectircally reading an image.

20 Claims, 2 Drawing Sheets

IMAGE READING METHOD AND IMAGE READING APPARATUS

BACKGROUND OF THE INVENTION

1. Field of the Invention

The present invention relates to a technical field of an image reading method and an image reading apparatus for photoelectrically reading an original image, particularly, an image photographed on a film.

2. Description of the Related Art

Currently, in case that an image photographed on a photographic film such as a negative film or a reversal film (hereinlater, abbreviated to a film) is printed to a photosensitive material (photographic paper), a direct exposure (an analog exposure) in which the photosensitive material is exposed by projection light of the film, is a main stream.

On the contrary, recently, a printing apparatus using digital exposure, that is, a digital photo printer is put into practical use in which an image photographed on a film is photoelectrically read, and after the read image was converted to a digital signal, the digital signal is subjected to various image processing to obtain image data for recording, and recording the image (latent image) by scan-exposing the photosensitive material to a recording light modulated in correspondence with the image data, to thereby obtain a (finished) print.

In the digital photo printer, an image is converted into digital image data and an exposing condition upon printing can be decided by an image data processing. Therefore, a correcting process for white compression (washed-out highlight) or black compression (dull shadow) in the image due to backlight, photographing using a strobe or the like, a sharpening process, etc. are preferably performed, thereby being capable of obtaining a high quality print that has not been obtained by the conventional direct exposure. Synthesization and division of the image, synthesization of characters, and the like can also be executed by the image data processing and, in response to applications, a freely edited/processed print can be outputted as well.

In addition, according to the digital photo printer, not only an image is outputted as a print (a photograph), but also image data is supplied to a computer or the like or can be stored into a recording medium such as a floppy disk. The image data, thus, can be used for various applications other than a photograph.

A digital photo printer comprises basically a scanner for photoelectrically reading, by an image sensor such as a CCD sensor, an image recorded on a film by allowing to be incident upon reading light to the film and reading the projection light thereof; an image processing device for executing a predetermined image processing for image data read by the scanner or image data supplied from a digital camera or the like and for setting the processed data to image data for image recording, that is, an exposure condition; a printer (image recording device) for recording a latent image, for example, by scan-exposing a photosensitive material by light beam scanning in correspondence with the image data outputted from the image processing device; and a processor (developing device) for developing the photosensitive material exposed by the printer, to thereby obtain a (finishing) print to which the image is reproduced.

In the digital photo printer, in order to output a print to which an image having high quality has been reproduced, it is necessary that as much image information as possible is obtained from a film as an original. A image reading operation with high gradation resolution, therefore, is needed. For this purpose, preferably, the whole density range of the image photographed to the film is read by the maximum use of a dynamic range of a scanner (an image sensor) maximally.

Meanwhile, the whole density range of the image photographed to the film has to be read by the scanner so as to reproduce a proper image. As for an image photographed to a film, however, there is an image that is properly exposed, over-exposed, or under-exposed. An image having an extremely wide density range can be photographed to a film. On the other hand, the dynamic range of the scanner is limited.

That is, in the present circumstances, it is extremely difficult that all images can be read by high gradation resolution under a single reading condition.

In the scanner, thus, prior to an image reading operation (main scan) so as to obtain image data for output, a pre-scan in which an image is roughly read is executed. In correspondence with the image data (pre-scanned data) obtained at the pre-scan, a reading condition of the main scan is set.

Specifically, at the pre-scan time, even if the gradation resolution is low, the whole density range of all images as a target is subjected to an image reading operation under a reading condition in which an output of the image sensor can be accurately read without saturation.

At the main scan time, a reading condition for each image is set from the obtained pre-scanned data so that the output of the image sensor is saturated with slightly lower density than the lowest density of the image and the image reading operation is executed under the reading condition.

Generally, an output signal from the image sensor has low intensity. Accordingly, after the amplification of the output signal by an amplifier, the conversion of the signal by an A/D converter is carried out to thereby obtain a digital image signal.

In the scanner, by this operation, the image reading operation is realized by high gradation resolution in correspondence with images of various densities including an image of over-exposure, under-exposure, and the like by the maximum use of the dynamic range of the scanner.

In the scanner, adjustment of the reading condition is mainly executed by arranging a variable aperture in a reading optical path, adjusting the aperture value (amount), and adjusting (exposure controlling) the light quantity of the reading light incident upon the film. The adjustment of the light quantity by the variable aperture is performed by adjusting the inserting amount of a shading member into the optical path, an aperture amount, and the light quantity that passes through the variable aperture with a shading member such as an aperture plate or the like.

In order to perform preferably a reading operation in correspondence with the images in various states, transporting means of the shading member and control means of the shading member such as an aperture table, which can adjust the inserting amount of the shading member with high resolution and at high precision, are needed. This is one of factors that cause an increase in cost of the scanner.

As one of factors of a decrease in reading precision in the scanner, it is know, what is called, shading in which a light quantity of the light inputted to the image sensor is uneven in a direction of the film surface due to the characteristics of a reading light source or a lens. In the normal scanner, a correction coefficient (shading correction coefficient) for every pixel of the image sensor is calculated. The output signal of each pixel from the image sensor is corrected by the correction coefficient, thereby correcting an error by shading.

However, in the scanner for adjusting the light quantity by the variable aperture, the shading state is varied by the aperture value, that is, the inserting amount of the shading member. Thus, reading precision is decreased in dependence on an aperture value, or in order to stably perform a reading operation at high precision, a shading correction is needed while preparing a plurality of correction coefficients in correspondence with an aperture value, thereby increasing costs of the apparatus.

SUMMARY OF THE INVENTION

In order to solve the above-mentioned problems inherent in the conventional technique, an object of the present invention is to provide an image reading method and an image reading apparatus in which when a light quantity is adjusted and a photoelectric reading operation is executed in correspondence with an image state, it is capable of making a variable aperture unnecessary, eliminating a fluctuation of shading, etc., because of the adjustment of light quantity, and realizing a reading operation by the apparatus at low cost and at high precision.

To attain the above object, there is provided an image reading method comprising the steps of: reading photoelectrically an original image by an image sensor; and converting an output signal of the image sensor into a digital signal; characterized in that at least one of an adjusting step of a light quantity which is incident to the image sensor by a light transmittance adjusting operation in an optical path, a sensing condition control step in the image sensor, and an intensity adjusting step of the output signal from the image sensor is used and the maximum value of a signal upon being converted into the digital signal, without recourse to the original image, is set to be constant.

Preferably, the adjusting step of the quantity of the light incident upon the image sensor is performed by allowing at least one of an ND filter assembly with different transmittances, a liquid crystal filter with variable transmittance in accordance with an applied voltage, a liquid crystal display in which a transmittance can be changed in correspondence with the applied voltage, a digital micromirror device, an electrooptical crystal in which the transmittance can be changed in correspondence with the applied voltage, means for adjusting transmission light quantity in correspondence with an angle for a light axis of a plate in which a plurality of mesh plates are arranged in a direction of a film surface under a state where their positions lie on the direction extending in the light axis direction to act on the optical path.

Preferably, the ND filter assembly with different transmittance is at least one of a plurality of ND filters with different transmittances and an ND filter with variable transmittance.

Preferably, the adjusting step of the quantity of the light incident upon the image sensor is performed by allowing at least one of a plurality of ND filters with different transmittances and an ND filter with variable transmittance to act on the optical path.

Preferably, the plurality of ND filters with different transmittances are 5 pieces of glass ND filters in which transmittances are 0.05, 0.1, 0.2, 0.4 and 0.8, and the ND filter with variable transmittance is a meshed ND filter in which the transmittances are 0.05, 0.1, 0.2, 0.4 and 0.8.

Preferably, the image sensor is a CCD sensor and the sensing condition control step is a step of controlling an accumulating time of the CCD sensor.

Preferably, the intensity adjusting step of the output signal from the image sensor is a step of adjusting analog gain for amplifying the output signal from the image sensor.

Preferably, the sensing condition control step of the image sensor is a step of performing different controls among three primary colors so as to absorb a remainder of an adjusting amount of the incident light quantity adjusting step upon the image sensor due to the light transmittance adjusting operation in the optical path.

Preferably, the intensity adjusting step of the output signal from the image sensor is a step of performing different controls among three primary colors so as to absorb a remainder of a control amount of the sensing condition control step of the image sensor.

According to the present invention, there is provided an image reading apparatus, characterized by comprising: an image sensor for photoelectrically reading light carrying an original image; means for controlling a sensing condition of the image sensor; intensity adjusting means for adjusting intensity of an output signal from the image sensor; an analog/digital converter for converting the signal adjusted by the intensity adjusting means into a digital signal; light quantity adjusting means for adjusting a quantity of light incident upon the image sensor by a light transmittance adjusting operation; and setting means for setting a reading condition of the original image so that a maximum value of a signal inputted to the analog/digital converter is constant by at least one of a sensing condition control operation of the image sensor by the sensing condition controlling means, a signal intensity adjustment operation by the intensity adjusting means, and an incident light quantity adjustment operation due to the light transmittance adjusting operation by the light quantity adjusting means, without recourse to the original image.

Preferably, the light quantity adjusting means is at least one of an ND filter assembly with different transmittances, a liquid crystal filter with variable transmittance in accordance with an applied voltage, a liquid crystal display in which a transmittance can be changed in correspondence with the applied voltage, a digital micromirror device, an electrooptical crystal in which the transmittance can be changed in correspondence with the applied voltage, means for adjusting transmission light quantity in correspondence with an angle for a light axis of a plate in which a plurality of mesh plates are arranged in a direction of a film surface under a state where their positions lie on the direction extending in the light axis direction.

Preferably, the ND filter assembly with different transmittance is at least one of a plurality of ND filters with different transmittances and an ND filter with variable transmittance.

Further, according to the present invention, the light quantity adjusting means is preferably at least one of a plurality of ND filters whose transmittances are different and an ND filter whose transmittance is variable.

Preferably, the plurality of ND filters with different transmittances are 5 pieces of glass ND filters in which transmittances are 0.05, 0.1, 0.2, 0.4 and 0.8, and the ND filter with variable transmittance is a meshed ND filter in which the transmittances are 0.05, 0.1, 0.2, 0.4 and 0.8.

Preferably, the image sensor is a CCD sensor, the sensing condition control means is means for controlling an accumulating time of the CCD sensor and the sensing condition control operation is an operation of controlling the accumulating time of the CCD sensor.

Preferably, the intensity adjusting means is an amplifier for amplifying the output signal from the image sensor and the signal intensity adjustment operation is an operation of adjusting analog gain of the amplifier.

Preferably, the reading condition setting means allows the sensing condition controlling means to perform different controls among three primary colors so as to absorb a remainder of an adjusting amount of the incident light quantity upon the image sensor due to the light quantity adjusting means.

Preferably, the reading condition setting means allows the intensity adjusting means to perform different controls among three primary colors so as to absorb a remainder of a control amount of the sensing condition of the image sensor due to the sensing condition controlling means.

With respect to the reading condition setting means, preferably, the following is executed. A main adjustment is executed by transmittance adjustment of the light quantity adjusting means. A range where adjustment cannot be made by the transmittance adjustment of the light quantity adjusting means is subjected to the sensing condition control operation of the image sensor with respect to each of three primary colors. A range where adjustment cannot be further made by the above adjusting operations is subjected to a signal intensity adjustment operation by the intensity adjusting means.

DETAILED DESCRIPTION OF THE PREFERRED EMBODIMENT

An image reading method and an image reading apparatus according to the present invention will now be described in detail by way of a preferred embodiment in conjunction with the accompanying drawings.

Figure 1:
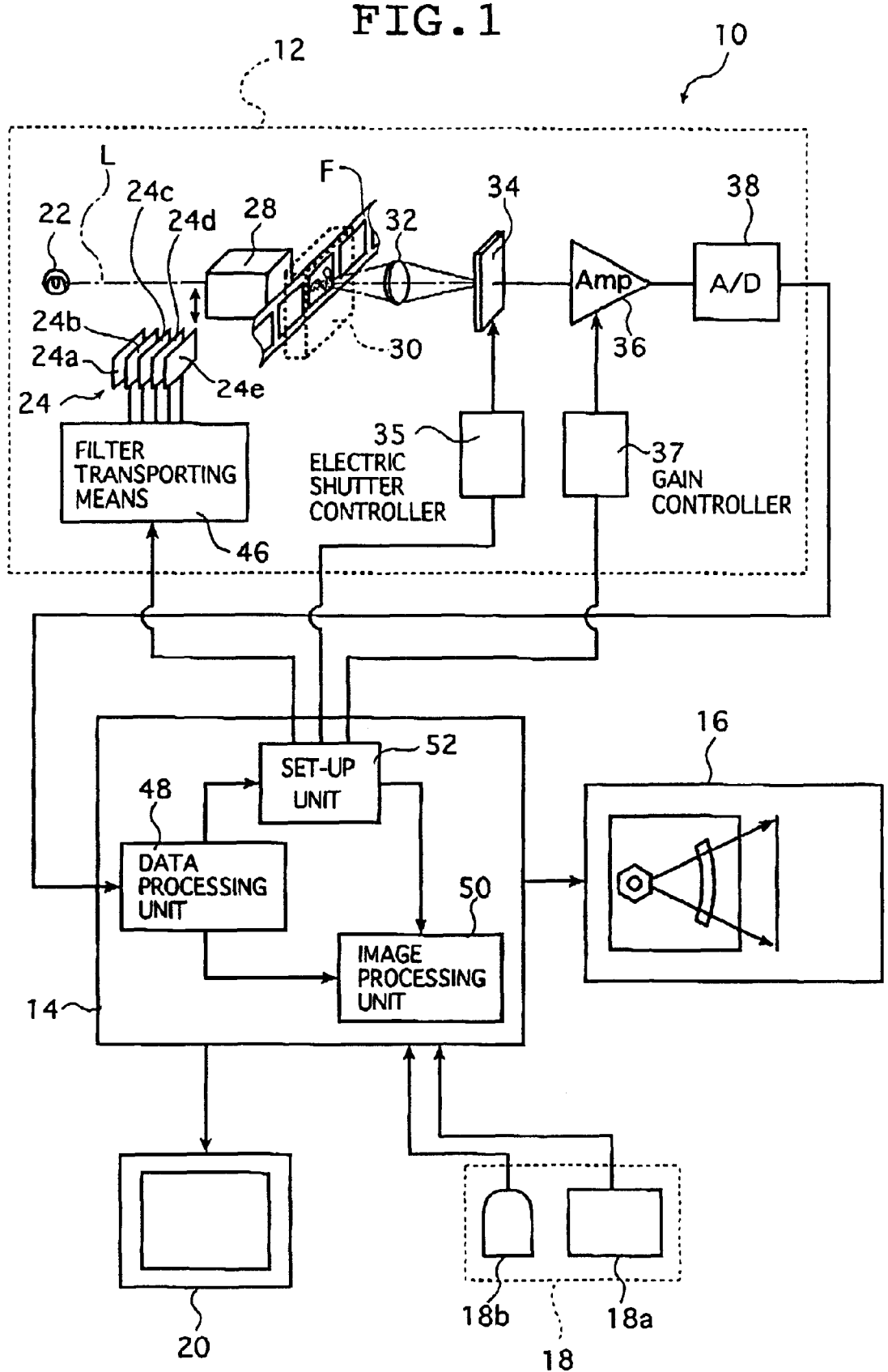
FIG. 1 is a block diagram showing a digital photo printer employing the present invention.

FIG. 1 is a block diagram showing an embodiment of a digital photo printer employing the image reading method and image reading apparatus of the present invention.

A digital photo printer (hereinafter, referred to as a photo printer 10) shown in FIG. 1 basically comprises a scanner 12 for photoelectrically reading an image photographed on a film F; an image processing apparatus 14 for executing an image processing of the read image data, and an operation, a control and a management etc. for the whole photo printer 10; a printer 16 for subjecting a photosensitive material (photographic paper) to an image exposing process by a light beam modulated in correspondence with the image data outputted from the image processing device 14 and to a developing process for outputting it as a (finishing) print. The present image reading apparatus comprises the scanner 12 and the image processing device 14.

An operational system 18 having a keyboard 18a and a mouse 18b for inputting (setting) various conditions, selecting and instructing processes, and inputting instructions such as color/density correction and a display 20 for displaying the image read by the scanner 12, various operational instructions, a condition setting/registration picture plane, and the like are connected to the image processing device 14.

The scanner 12 is a device for photoelectrically reading an image photographed to the film F or the like one frame by one. The scanner 12 includes: a light source 22; a light quantity adjusting means 24; a diffusion box 28 for uniformizing in a direction of the film F surface the reading light inputted to the film F; an image forming lens unit 32; an image sensor 34 having line CCD sensors corresponding to each image reading operation of R (red), G (green), and B (blue); an amplifier 36; and an A/D (analog/digital) converter 38.

In the scanner 12, the reading light emitted from the light source 22 is adjusted in its light quantity by the light adjusting means 24.

According to the present invention, the light quantity adjustment of the image reading operation is executed by the light quantity adjusting means for adjusting a transmission light quantity of the reading light by adjusting the transmittance without using what is called a variable aperture. The light quantity adjusting means 24 in the embodiment as shown uses an ND filter assembly having five ND filters 24a–24e with different transmittances. As an example, a first ND filter 24a is an ND filter of density of 0.05 in terms of density of the film F; a second ND filter 24b an ND filter of density of 0.1; a third ND filter 24c an ND filter of density of 0.2; a forth ND filter 24d an ND filter of density of 0.4; and a fifth ND filter 24e an ND filter of density of 0.8, while each density of the ND filters 24a to 24e is the same in terms density of the film F, similarly.

Those ND filters are moved as shown by an arrow in the drawing by filter transporting means 46. One or a plurality of ND filters that are properly combined are inserted into an optical path L, and also extracted from the optical path L. The light quantity adjusting means 24 as an example shown in the drawing adjusts the transmittance and executes a light quantity adjustment (exposure control) of the reading light corresponding to an adjusting operation of the density per 0.05 in terms of density of the film F within a range 0 to 1.55 in terms of it.

Upon reading, which filter is inserted to the optical path L, that is, drive of the filter transporting means 46 is determined by a set-up unit 52 in the image processing device 14 in correspondence with an image photographed to the film F or the like. This will be described in detail hereinlater. The transporting method of each ND filter of the ND filter assembly (24a–24e) by the filter transporting means 46 is not especially limited. Various transporting means of the well-known member such as a gear, a linkage mechanism, a rack and pinion, a screw transmission, or a cam are available.

All of the well-known ND filter or ND filter assembly having a plurality of ND filters are available. For instance, an ND filter assembly having ND filters with different transmittances by glass vapor deposition, or a mesh ND filter with a variable transmittance or a plurality of different transmittance can be also used. Further, the light quantity adjusting means can be also disposed on the down stream side of the light progressing direction from the film F.

According to the present invention, the light quantity adjusting means by the transmittance adjustment is not limited by the method of using the ND filter assembly having five ND filters 24a–24e with different transmittance, as shown in the embodiment of the drawing. The ND filter assembly having four ND filters or less, or six or more ND filters can be combined as light quantity adjusting means of the transmittance adjustment. Besides means for using a plurality of ND filters, a light quantity adjusting means using various transmittance adjustment can be used.

For instance, there are exemplified a liquid crystal filter or a liquid crystal display in which transmittance can be changed in correspondence with an applied voltage, a DMD (digital micromirror device; a semiconductor element in which an angle of a micro mirror can be changed), an electrooptical crystal in which a transmittance can be changed in correspondence with a voltage, means for adjusting transmission light quantity in correspondence with an angle for the light axis of the plate in which a plurality of mesh plates are arranged in the direction of the film surface under a state where their positions lie on the direction extending in the light axis direction, and the like.

The reading light that has been light quantity adjusted by the light quantity adjusting means 24, is diffused by the diffusion box 28, allowing the light to be uniform in the direction of the film surface, to be inputted to the film F, to be transmitted, and becomes projection light carrying an image of the film F.

In this embodiment, in the photo printer 10, a specific carrier that is attachable/detachable to the main body of the scanner 12 is prepared in correspondence with kinds of films and sizes such as an Advanced Photo System film, a negative (or reversal) film of 135-size, and a film format such as strips or a slide. An image (frame) that is photographed to a film and supplied for print formation is conveyed to a predetermined reading position by the carrier.

Figure 2A:
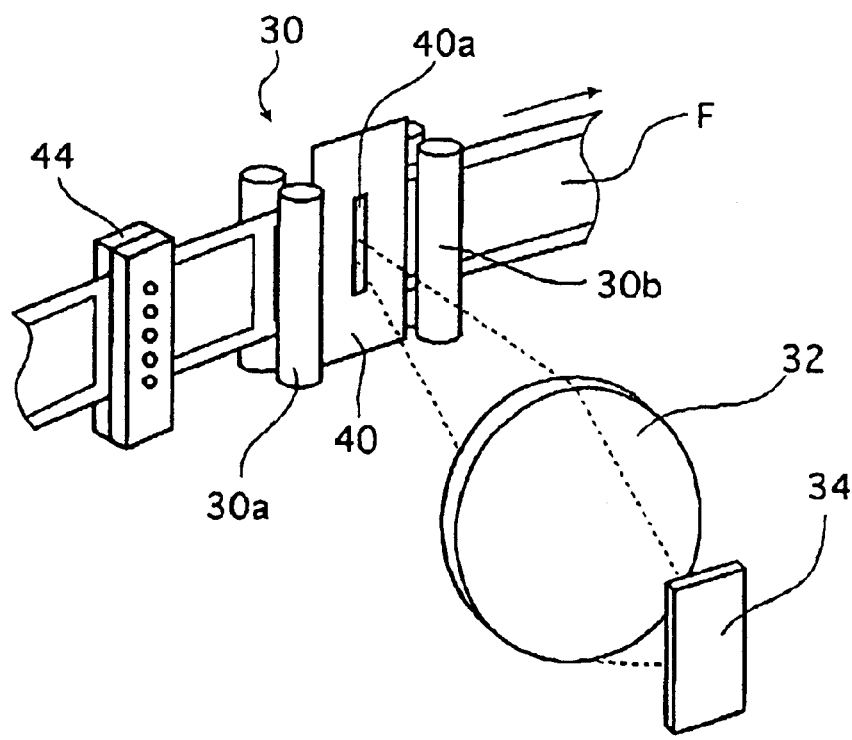
FIG. 2A is a conceptional diagram showing a carrier to be set to the digital photo printer shown in FIG. 1.

As schematically shown in FIG. 2A, the carrier 30 includes: a pair of conveyer rollers 30a and 30b for, while positioning the film F at a predetermined reading position, conveying the film F whose longitudinal direction corresponds to the auxiliary scan direction that is orthogonal to the direction (main scanning direction) in which the line CCD sensors of the image sensor 34 exist on the extended direction, which are arranged sandwiching the reading position in the auxiliary scan direction; a mask 40 having a slit 40a for allowing the projection light of the film F to be restricted so as to be a predetermined slit-shape, which exists in the direction extended in the main scanning direction positioning in correspondence with the reading position.

The film F is positioned to the reading position by the carrier 30 while the film is conveyed in the auxiliary scan direction and the reading light is inputted to the film F. Thus, as a result, the film F is 2-dimensionally slit-scanned by the slit 40a (reading light).

Reference numeral 44 in the drawing is a code reader for optically reading bar codes or the like such as a DX code, an expansion DX code, or an FNS code which were optically recorded to the film various information read by the code reader 44 is transmitted to a predetermined portion such as the image processing device 14 or the like, as necessary.

As already known, a magnetic recording medium is formed to a film of the Advance Photo System. To cope with this, a magnetic head that reads magnetic information recorded to the magnetic recording medium of the film and also magnetically records necessary information is arranged to a carrier in correspondence with a film (cartridge) of the Advanced Photo System.

As described above, the reading light passes through the film F held in the carrier 30, thereby becoming projection light carrying the image. The projection light forms an image on a photosensitive surface of the image sensor 34 by the image forming lens unit 32.

Figure 2B:
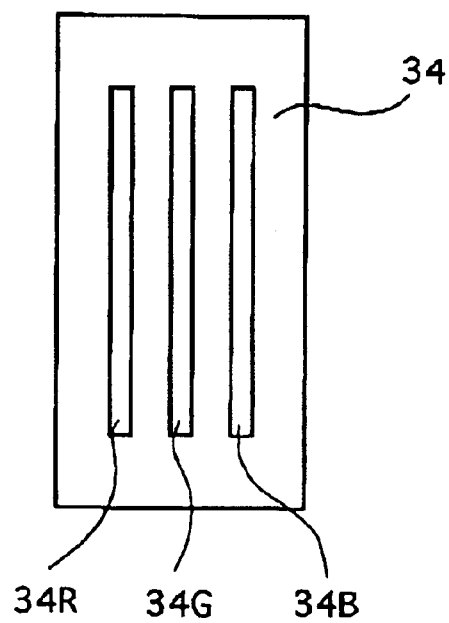
FIG. 2B is a conceptional diagram showing an image sensor to be disposed to the digital photo printer shown in FIG. 1.

As shown in FIG. 2B, the image sensor 34 is what is called a 3-line color CCD sensor having a line CCD sensor 34R for reading an R-image, a line CCD sensor 34G for reading a G-image, and a line CCD sensor 34B for reading a B-image. Each line CCD sensor exists in the direction extending in the main scanning direction as mentioned above. The projection light of the film F is separated into three primary colors of R, G, and B by the image sensor 34 and photoelectrically read.

An output signal (image signal) of the image sensor 34 is amplified by the amplifier 36, converted into a digital image signal by the A/D converter 38, and transmitted to the image processing device 14.

The set-up unit 52 of the image processing device 14 determines an accumulating time (electric shutter speed) of each line CCD sensor 34 (34R, 34G, 34B) and an analog gain (amplifying rate) in the amplifier 36 in correspondence with an image photographed to the film F.

The accumulating time of each line CCD sensor is controlled by an electric shutter controller 35 which is the sensing condition controlling mans of the image sensor of the present invention. The analog gain in the amplifier 36 is adjusted by a gain controller 37 which is the intensity adjusting means of the present invention. Therefore, the set-up unit 52 sets the determined accumulating time on the electric shutter controller 35 and the determined analog gain on the gain controller 37.

This will be described in detail hereinlater.

In the scanner 12, the operation for reading the image photographed to the film F is executed by operating image reading twice, that is, both by the pre-scanning for reading the image with low resolution and by the main scanning for obtaining the image data for the output after the pre-scanning.

The pre-scanning is executed under a predetermined reading condition of the pre-scanning in which corresponding to all images as a target of the scanner 12, the maximum value of the image signal converted by the A/D converter 38 is equal to a predetermined value.

Meanwhile, the main scanning is executed under a reading condition of the main scanning set for every frame in which the maximum value of the image signal of the image converted by the A/D converter 38 is equal to a predetermined value, using the image data obtained by the pre-scanning. This will be described in detail hereinbelow. As for the predetermined value for the maximum value of the image signal, that of the pre-scanning can be different from that of main scanning, or the former can be same as the latter.

Since upon reading, the pixel density of pre-scanning is different that of main scanning, the reading pixel densities of each line CCD sensor and the conveying speeds of the film F in the auxiliary scan direction in the pre-scanning and main scanning are different, respectively. Fundamentally, the pre-scanning and main scanning are performed similarly, except for the above different conditions.

According to the present invention, the image reading operation can be performed by surface exposure in which the whole surface of one frame is read once without being limited by such a slit-scan exposure.

In this case, for example, the area CCD sensor is used as follows. Inserting means of a filter of each of colors of R, G, and B is set between the light source and the film F. The image reading operation by the area CCD sensor by inserting each color filter is sequentially executed by filters of each color R, G, and B. The image photographed to the film F is read by separating the image into three primary colors.

The present invention can be preferably used to an operation for photoelectrically reading a reflected original other than the image reading operation of the film F as shown in the example in the drawing.

As described above, the digital image signal outputted from the scanner 12 is outputted to the image processing device 14 (hereinlater, abbreviated to a processing device 14).

The processing device 14 includes: a data processing unit 48; an image processing unit 50; and the set-up unit 52. FIG. 1 shows portions regarding, mainly, image processing operations. In addition, a CPU for controlling and managing the whole photo printer 10 including the processing device 14 and a memory and the like for storing information which is necessary for the operation of the photo printer 10 and the like, are arranged in the processing device 14. The operating system 18 and display 20 are connected to each portion via the CPU or the like (CPU bus).

Each digital image signal of R, G, and B outputted from the scanner 12 is subjected to a predetermined data processing such as a dark time correction, a default pixel correction, or a shading correction in the data processing unit 48, and further, is Log-converted, thereby becoming digital image data (density data).

The image data outputted from the data processing unit 48 is subjected to a predetermined image processing in the image processing unit 50, and, further, is converted by 3D (3-dimensional)-LUT, thereby being set to image data for outputting in correspondence with the image recording operation in the printer 16 or the image data in correspondence with the image display in the display 20.

The image processing conducted by the image processing unit 50 has no limitation. There are exemplified a variety of image processing, such as, a color balance adjustment, a gradation adjustment, a density adjustment, a chromaticness adjustment, an electric magnification process, a dodging process (compression/decompression of a density dynamic range), and a sharpening process in the well-known image processing apparatus. Each processing may be executed by the well-known means using a process by applying a look-up table (LUT), a matrix (MTX) arithmetic operator, a low pass filter, an adder and the like, or using an averaging process by properly combining them, an interpolating arithmetic operation or the like.

An image processing condition in the image processing unit 50 and a reading condition in the main scanning are set by the set-up unit 52.

In the set-up unit 52, first, the density histogram of the image (frame) is formed by using the image data (pre-scanned data) processed by the data processing unit 48. Image characteristic amounts such as average density, large area transmitting density (LATD), the lowest density and the highest density (a predetermined frequency point (%) in the density histogram), the maximum frequency point in the density histogram of the image are calculated.

Subsequently, the set-up unit 52 sets an image processing and an image processing condition to be executed and the reading condition at the main scanning by using the density histogram and the image characteristic amount. The image processing and the image processing condition to be executed can be set by the well-known method in correspondence with the density histogram and the image characteristic amount and, further, an input of an instruction by the operator by using the keyboard 18a or the like. The image processing condition is properly adjusted by examination or the like using the keyboard 18a, etc.

On the other hand, in the photo printer 10, the reading condition at the main scanning, specifically, the ND filter inserted to the optical path L by the light quantity adjusting means 24, the accumulating time of each line CCD sensor in the image sensor 34, and the analog gain of the amplifier 36 (hereinlater, abbreviated to a gain) are basically set as follows.

In the photo printer 10 shown as an embodiment with respect to the accumulating time of each line CCD sensor 34R, 34G, 34B in the image sensor 34 and the gain of the amplifier 36, a reference reading condition at the main scanning (hereinbelow, abbreviated to a reference condition) is set. Those can be similar to the pre-scanning or different from that.

The set-up unit 52, first, by setting the image sensor 34 and amplifier 36 to the reference condition, determines a setting of the light quantity adjusting means 24, that is, the ND filter assembly 24a–24e inserted to the optical path L so that in the image, the maximum value of the image signal inputted to the A/D converter 38 (hereinafter, abbreviated to a signal maximum value) is equal to a predetermined value. In other words, the setting of the light quantity adjusting means 24 is determined so that the image signal of the lowest density of the image is equal to the predetermined value. As will be obviously understood, this condition is set so that the output of the image sensor 34 is not saturated.

In the case where the signal maximum value can be set to be the predetermined value in the above setting, as a result, the reading condition at the main scanning is determined. However, as mentioned above, the light quantity adjusting operation by the light quantity adjusting means 24 is performed per 0.05 obtained by converting to the density of the film F step by step. By only the light quantity adjusting operation, the signal maximum value cannot be set to be the predetermined value in many cases.

In this case, by setting the light quantity adjusting means 24 to the above setting and the amplifier 36 to the reference condition, the set-up unit 52 sets each accumulating time (adjusting amount from the reference condition) of the line CCD sensor 34R of the image sensor 34, line CCD sensor 34G, and line CCD sensor 34B so that the signal maximum value is equal to a predetermined value. That is, a portion that cannot be adjusted by the light quantity adjusting means 24 under the reading condition of the image sensor 34.

As will be obviously understood, the accumulating time is also set so that the output of the image sensor 34 is not saturated. In the present invention, by setting the accumulating time for every line CCD sensor, the color balance adjustment for the image photographed to the film F can be executed.

In the case where the signal maximum value is a predetermined value by the setting, the reading condition of the main scanning is determined.

Contrarily, even if the signal maximum value is not a predetermined value by the setting, while setting the light quantity adjusting means 24 and the image sensor 34 to the above setting, the set-up 52 sets the gain (adjusting amount from the reference condition) of the amplifier 36 so that the signal maximum value is a predetermined value and this setting is set to a reading condition of the main scanning. That is, a portion that cannot be adjusted by the light quantity adjusting means 24 and image sensor 34 is adjusted by the gain of the amplifier 36.

The gain of the amplifier 36 can be set every image signal of R, G, and B. The color balance adjustment of the image to be photographed to the film F can be executed by the gain of the amplifier 36 as well.

As described above, the normal scanner adjusts the light quantity upon image reading in correspondence with the image photographed to the film F or the like by the variable aperture using a shading member such as a shading plate. Therefore, there arise a problem in which a shading state is fluctuated because of a difference of the aperture values, with the result that an image reading operation at high precision cannot be executed, and the like.

On the other hand, according to the present invention, the light quantity adjustment of the image reading in correspondence with the image photographed to the film F or the like is performed by the transmittance adjustment in the optical path L. In addition to the light quantity adjustment, by the adjustment of the reading condition by the image sensor 34 and the gain adjustment by the amplifier 36, the maximum value of the image signal inputted to the A/D converter is constant irrespective of an image. According to the present invention, by using the foregoing, the variable aperture is unnecessary, a fluctuation of the shading caused by the light adjustment is eliminated, and the image reading operation with the maximum use of the dynamic range of the scanner 12 can be performed by an apparatus at low cost and at high precision.

The invention will be now described in detail by illustrating a function of the scanner 12 and a processing device 14 hereinafter.

The operator who is requested for a print formation of the film F loads the carrier 30 corresponding to the film F into the scanner 12, sets the film F (cartridge) at a predetermined position of the carrier 30, after inputting a necessary instruction such as a print size, and instructs a print forming start.

Thus, in the scanner 12, an accumulating time of the light quantity adjusting means 24 and image sensor (line CCD sensor 34 and the gain of the amplifier 36 are set in correspondence with the reading condition at the pre-scanning. The carrier 30 conveys the film F at a speed corresponding to the pre-scanning in the auxiliary scan direction and the pre-scanning operation is started. The light is adjusted by the light quantity adjusting means 24 and the reading light diffused by the diffusion box 28 is inputted to the reading position. The film F scan-conveyed at the reading position is slit-scanned by the reading light. The projection light forms an image to the image sensor 34. The image photographed to the film F is separated to R, G, and B and photoelectrically read.

According to the present invention, the pre-scanning and the main scanning operations can be performed one frame by one. The pre-scanning and the main scanning operations can be also performed with respect to all frames or can be continuously performed every predetermined plurality frames. In the following embodiment, in order to simplify the description, an operation of reading an image of one frame will be described as an example.

The image data outputted from the image sensor 34 at the pre-scanning is amplified by the amplifier 36, transmitted to the A/D converter 38, and converted into a digital image signal.

The digital image signal is subjected to a predetermined process by the data processing unit 48 and set to pre-scanned data serving as the digital image data.

The pre-scanned data is supplied to the set-up unit 52. From the pre-scanned data, the set-up unit 52 forms density histogram of the image, executes a calculation and the like of the image characteristic amounts such as the lowest density, and the highest density, and sets an image processing and an image processing condition to be executed, thereby setting them to a predetermined position (hardware) of the image processing unit 50.

The set-up unit 52 sets the reading condition of the main scanning as mentioned above from the density histogram and the image characteristic amount. That is, kinds and number of the ND filters in the ND filter assembly 24a–24e to be inserted by the light quantity adjusting means 24 is determined so that the signal maximum value inputted to the A/D converter 38 is equal to a predetermined value. Or, further, an accumulating time of each line CCD sensor of the image sensor 34 is determined, or the gain of the amplifier 36 is further determined. The kinds and number of the ND filters of the ND filter assembly 24a–24e, the accumulating time of each line CCD sensor 34R, 34C, 34B and the gain of the amplifier 36 are supplied and set to predetermined sites of the scanner 12, that is, the filter transporting means 46, the electric shutter controller 35 and the gain controller 37, respectively.

In case that examination is carried out, if the image processing condition is set to the image processing unit 50, the pre-scanned data is supplied to the image processing unit 50, processed under the set image processing condition, converted in correspondence with the display by the display 20, and displayed to the display 20 as a simulation image.

The operator examines while seeing the display of the display 20 and adjusts color, density, gradation, and the like by the keyboard 18a as necessary. The set-up unit 52 adjusts the image processing condition that has been set to the image processing unit 50 in correspondence with the above adjustment, and the image to be displayed to the display 20 is also changed in correspondence with the adjustment result.

When the operator decides that the image is proper (the verification is OK), he or she instructs a printing start by using the keyboard 18a or the like and, consequently, the image processing condition is determined.

In the case where the verification is not performed, the image processing condition is decided at the time point when the set-up unit 52 sets the image processing condition to the image processing unit 50. The presence or absence of the verification can be preferably selected as a mode or the like.

When the image processing condition is determined, the main scanning is started. First, according to the reading condition of the main scanning supplied from the set-up unit 52, the ND filter or filters (24a, ... , 24e) is inserted to the optical path L by the light quantity adjusting means 24 (the filter transporting means 46). The accumulating time of each line CCD sensor of the image sensor 34 is set to the electric shutter controller 35 and the gain of the amplifier 36 is set to the gain controller 37. Subsequently, the carrier 30 starts conveying the film F at a conveying speed in correspondence with the main scanning.

The main scanning is executed similarly to the pre-scanning other than under the above conditions and the condition in which the reading pixel density in the image sensor 34 are different from that. The light is emitted from the light source 22 and the light quantity is adjusted in correspondence with the set condition in the light quantity adjusting means 24. The reading light diffused in the diffusion box 28 is inputted to the reading position. The film F conveyed in the auxiliary scan direction while being held at the reading position by the carrier 30 is slit-scanned by the reading light.

The projection light of the film F forms an image to the image sensor 34 by the image forming lens unit 32 and is read for the set accumulating time. The image signal outputted from the image sensor 34 is amplified according to the gain set by the amplifier 36, set to the image signal whose signal maximum value is equal to a predetermined value, supplied to the A/D converter 38, converted into a digital image signal by the A/D converter 38, and transmitted to the processing device 14.

The digital image signal is processed by the processing unit 48 in the processing device 14 and set to the digital image data (main scanned data). Subsequently, the digital image data is subjected to an image processing in the image processing unit 50 in correspondence with the decided image processing condition, converted into image data in correspondence with the image recording by the printer 16, and outputted to the printer 16.

The printer 16 includes a printer (printing apparatus) for exposing a photosensitive material (photographic paper) in correspondence with the supplied image data and for recording a latent image; and a processor (developing device) for subjecting the exposed photosensitive material to a predetermined process and for outputting it as a print.

In the printer, for example, after the photosensitive material was cut every a predetermined length in correspondence with the print, a back print is recorded. Three kinds of light beams R-exposure, G-exposure, and B-exposure according to the spectral sensitivity characteristics of the photosensitive material are modulated in correspondence with the image data outputted from the processing device 14 and deflected in the main scanning direction. The photosensitive material is conveyed in the auxiliary scan direction that is orthogonal to the main scanning direction, and thus, a latent image is recorded by 2-dimensionally scan-exposing the photosensitive material by the light beams, and supplied to the processor. The processor that received the photosensitive material performs a predetermined wet developing processes such as color development, bleach-fixing, washing and the like, and dries to a print, thereby dividing it into a predetermined unit such as a roll of film and accumulating.

The image reading method and image reading apparatus have been described above in detail. However, the invention is not limited by the above embodiment and various improvements and modifications can be obviously executed in the scope without departing from the essential summary of the present invention.

As mentioned above, according to the present invention, in an operation for photoelectrically reading an image, a variable aperture is unnecessary, a shading fluctuation occurred in a light quantity adjusting operation is eliminated, and an image reading operation with a maximum use of a dynamic range of a scanner by an apparatus at low costs and at high precision can be executed.

What is claimed is:

1. An image reading method comprising the steps of:
    reading photoelectrically an original image by an image sensor; and
    converting an output signal of the image sensor into a digital signal;
    wherein at least one of an adjusting step of a quantity of light incident upon said image sensor by a light transmittance adjusting operation in an optical path, a sensing condition control step in said image sensor, and an intensity adjusting step of the output signal from said image sensor is used and a maximum value of a signal upon being converted into the digital signal is set to be constant without recourse to said original image.

2. The image reading method according to claim 1, wherein said adjusting step of the quantity of the light incident upon said image sensor is performed by allowing at least one of an ND filter assembly with different transmittances, a liquid crystal filter with variable transmittance in accordance with an applied voltage, a liquid crystal display in which a transmittance can be changed in correspondence with the applied voltage, a digital micromirror device, an electrooptical crystal in which the transmittance can be changed in correspondence with the applied voltage, means for adjusting transmission light quantity in correspondence with an angle for a light axis of a plate in which a plurality of mesh plates are arranged in a direction of a film surface under a state where their positions lie on the direction extending in the light axis direction to act on said optical path.

3. The image reading method according to claim 2, wherein said ND filter assembly with different transmittance is at least one of a plurality of ND filters with different transmittances and an ND filter with variable transmittance.

4. The image reading method according to claim 1, wherein said adjusting step of the quantity of the light incident upon said image sensor is performed by allowing at least one of a plurality of ND filters with different transmittances and an ND filter with variable transmittance to act on said optical path.

5. The image reading method according to claim 4, wherein said plurality of ND filters with different transmittances are 5 pieces of glass ND filters in which transmittances are 0.05, 0.1, 0.2, 0.4 and 0.8, and wherein said ND filter with variable transmittance is a meshed ND filter in which the transmittances are 0.05, 0.1, 0.2, 0.4 and 0.8.

6. The image reading method according to claim 1, wherein said image sensor is a CCD sensor and said sensing condition control step is a step of controlling an accumulating time of said CCD sensor.

7. The image reading method according to claim 1, wherein said intensity adjusting step of the output signal from said image sensor is a step of adjusting analog gain for amplifying the output signal from said image sensor.

8. The image reading method according to claim 1, wherein said sensing condition control step of said image sensor is a step of performing different controls among three primary colors so as to absorb a remainder of an adjusting amount of said incident light quantity adjusting step upon said image sensor due to said light transmittance adjusting operation in said optical path.

9. The image reading method according to claim 8, wherein said intensity adjusting step of the output signal from said image sensor is a step of performing different controls among three primary colors so as to absorb a remainder of a control amount of said sensing condition control step of said image sensor.

10. The image reading method according to claim 1, wherein said intensity adjusting step of the output signal from said image sensor is a step of performing different controls among three primary colors so as to absorb a remainder of a control amount of said sensing condition control step of said image sensor.

11. An image reading apparatus, comprising:
    an image sensor for photoelectrically reading light carrying an original image;
    means for controlling a sensing condition of said image sensor;
    means for adjusting intensity of an output signal from said image sensor;
    an analog/digital converter for converting the signal adjusted by said intensity adjusting means into a digital signal;
    means for adjusting a quantity of light incident upon said image sensor by a light transmittance adjusting operation; and means for setting a reading condition of the original image so that a maximum value of the signal inputted to said analog/digital converter is constant by at least one of a sensing condition control operation of said image sensor by said sensing condition controlling means, a signal intensity adjustment operation by said intensity adjusting means, and an incident light quantity adjustment operation due to said light transmittance adjusting operation by said light quantity adjusting means, without recourse to the original image.

12. The image reading apparatus according to claim 11, wherein said light quantity adjusting means is at least one of an ND filter assembly with different transmittances, a liquid crystal filter with variable transmittance in accordance with an applied voltage, a liquid crystal display in which a transmittance can be changed in correspondence with the applied voltage, a digital micromirror device, an electrooptical crystal in which the transmittance can be changed in correspondence with the applied voltage, means for adjusting transmission light quantity in correspondence with an angle for a light axis of a plate in which a plurality of mesh plates are arranged in a direction of a film surface under a state where their positions lie on the direction extending in the light axis direction.

13. The image reading apparatus according to claim 12, wherein said ND filter assembly with different transmittance is at least one of a plurality of ND filters with different transmittances and an ND filter with variable transmittance.

14. The image reading apparatus according to claim 11, wherein said light quantity adjusting means is at least one of a plurality of ND filters with different transmittances and an ND filter with variable transmittance.

15. The image reading apparatus according to claim 14, wherein said plurality of ND filters with different transmittances are 5 pieces of glass ND filters in which transmittances are 0.05, 0.1, 0.2, 0.4 and 0.8, and wherein said ND filter with variable transmittance is a meshed ND filter in which the transmittances are 0.05, 0.1, 0.2, 0.4 and 0.8.

16. The image reading apparatus according to claim 11, wherein said image sensor is a CCD sensor, said sensing condition control means is means for controlling an accumulating time of said CCD sensor and said sensing condition control operation is an operation of controlling the accumulating time of said CCD sensor.

17. The image reading apparatus according to claim 11, wherein said intensity adjusting means is an amplifier for amplifying the output signal from said image sensor and said signal intensity adjustment operation is an operation of adjusting analog gain of said amplifier.

18. The image reading apparatus according to claim 11, wherein said reading condition setting means allows said sensing condition controlling means to perform different controls among three primary colors so as to absorb a remainder of an adjusting amount of said incident light quantity upon said image sensor due to said light quantity adjusting means.

19. The image reading apparatus according to claim 11, wherein said reading condition setting means allows said intensity adjusting means to perform different controls among three primary colors so as to absorb a remainder of a control amount of said sensing condition of said image sensor due to said sensing condition controlling means.

20. The image reading apparatus according to claim 11, wherein said reading condition setting means executes a main adjustment by the transmittance adjustment of said light quantity adjusting means, adjusts a range where adjustment cannot be made by the transmittance adjustment of said light quantity adjusting means, by said sensing condition control operation of said image sensor with respect to each of three primary colors, and adjusts a range where adjustment cannot be further made by the signal intensity adjustment operation by said intensity adjusting means.

* * * * *